United States Statutory Invention Registration [19]

[11] Reg. Number: H883

Little et al. [43] Published: Feb. 5, 1991

[54] PROTECTIVE MASK

[75] Inventors: Malcolm E. Little; Robert P. Wagner, both of Fallston; William W. McCullough, Edgewood, all of Md.

[73] Assignee: The United States of America as represented by the Secretary of the Army, Washington, D.C.

[21] Appl. No.: 465,819

[22] Filed: Jan. 16, 1990

[51] Int. Cl.[5] ..... A62B 18/08

[52] U.S. Cl. ..... 128/201.17; 128/201.19; 128/201.22

*Primary Examiner*—Brian S. Steinberger

*Attorney, Agent, or Firm*—Anthony T. Lane; Edward Goldberg; Michael C. Sachs

[57] ABSTRACT

A protective mask is provided, which contains the eyes, nose and mouth, comprising a protruding lens so as to provide increased peripheral vision and preferably a nose cup which is shaped to provide a channel for passing defogging air to the lens, and peripheral areas of the mask which fold inward to form the seal.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROTECTIVE MASK

GOVERNMENTAL INTEREST

The invention described herein may be made, used or licensed by or for the Government for governmental purposes, without the payment to us of any royalties thereon.

BACKGROUND OF THE INVENTION

This invention relates to an improved mask for use in the presence of toxic or unpleasant airborne substances.

Protective masks, commonly called gas masks, have suffered from many defects including poor vision, poor comfort, poor perimeter sealing and lens fogging In accordance with the invention, substantial improvements are made in all of these areas

SUMMARY OF THE INVENTION

The mask comprises an elastomeric face piece, preferably of one piece, designed to enclose the eyes, nose and mouth of a wearer, a plurality of openings for lens, inhalation filter, exhalation, voice transmission, and wherein the lens protrude so as to provide increased peripheral vision. Preferably the peripheral areas of the mask also fold inward to form seals. For example, by fitting the mask with lens that protrude like an extended egg, increased peripheral vision is obtained. As a result, including other features to be discussed infra, superior vision is obtained In addition, the peripheral area of the mask around the chin is preferably formed into a chin rest which aids the mask's comfort. Further, by making the elastomer more resilient in the lens area, it was found that the lens would move easily in all directions to provide easy optical center adjustment and enhanced compatibility with sighting devices, weapons and the like. This resiliency not only improves the mask's performance but makes it more comfortable to use. Finally, improved optical performance was obtained by several other changes.

Because the lens are so close to the wearer's eyes, such as with prescription eye glasses, it was necessary to design a defogging system that was effective but not too harsh on the wearer's eyes so as to cause tearing. This is provided by an inverted V-shaped nose cup which encloses the nose and is flush with the cheeks inside the mask. Air brought in from either side of the mask is then deflected by this cup to one lens and then over the bridge of the cup to the other lens. Then air is passed through the nose cup valves into the mouth cavity for inhalation and removal out the exhalation valve. Thus, an efficient antifogging system is provided which is gentle to the wearer's eyes.

The other aspects of the mask such as inhalation filters, voice transmission, straps, etc., are conventional and well described in U.S. Pat. No. 4,595,003 which is herein incorporated by reference.

DETAILED DESCRIPTION OF THE INVENTION

Figure 1:
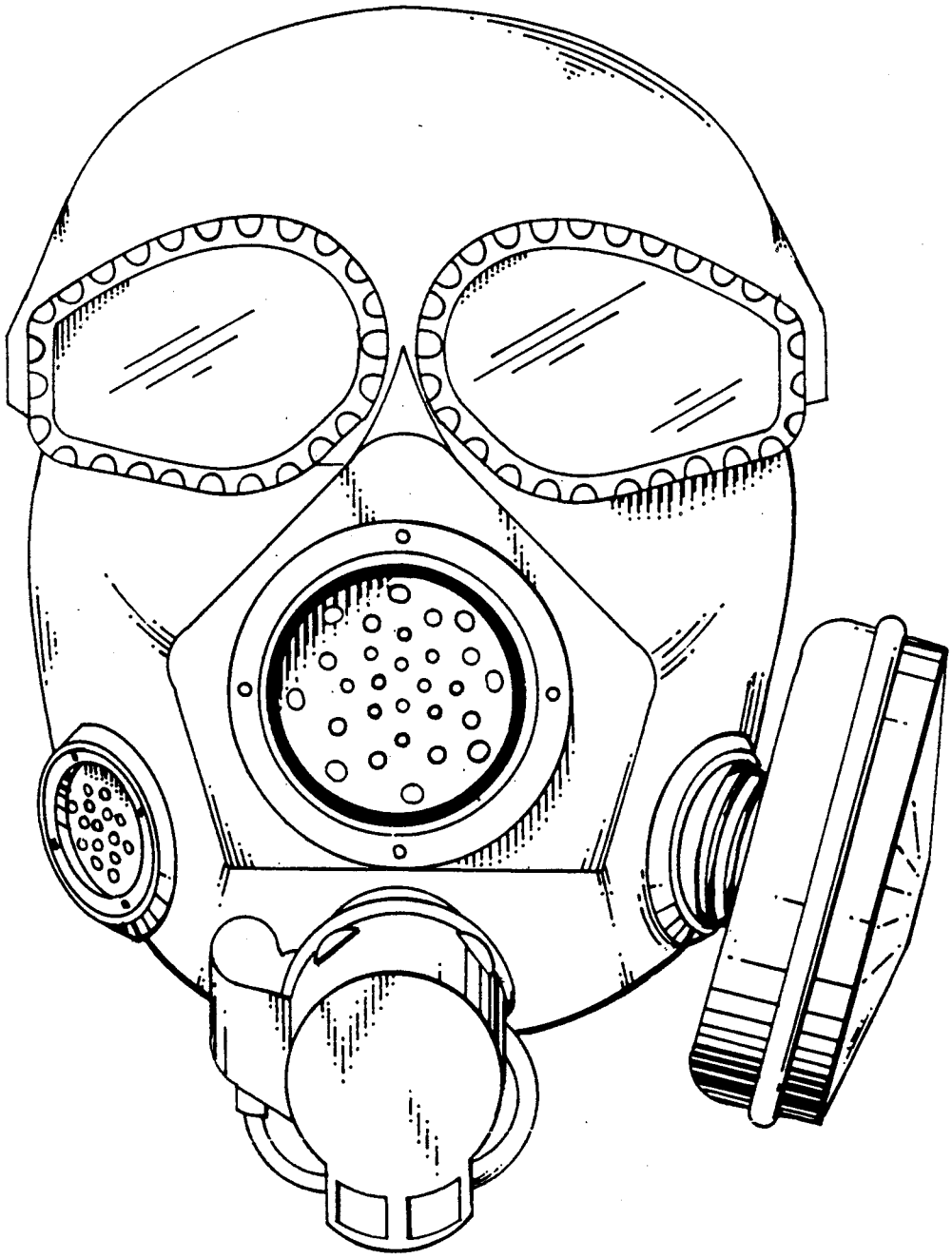
FIG. 1 is a frontal view of the mask.
Figure 4:
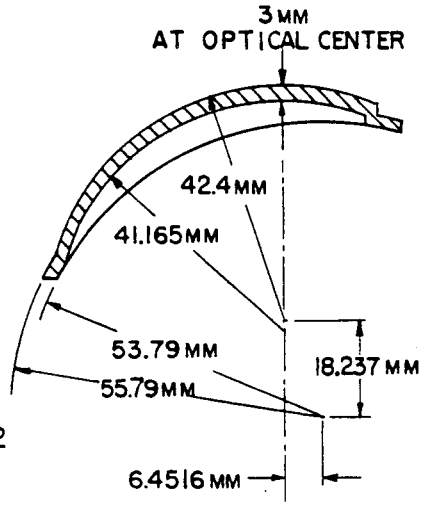
FIG. 4 is a cross section of the lens.
Figure 2:
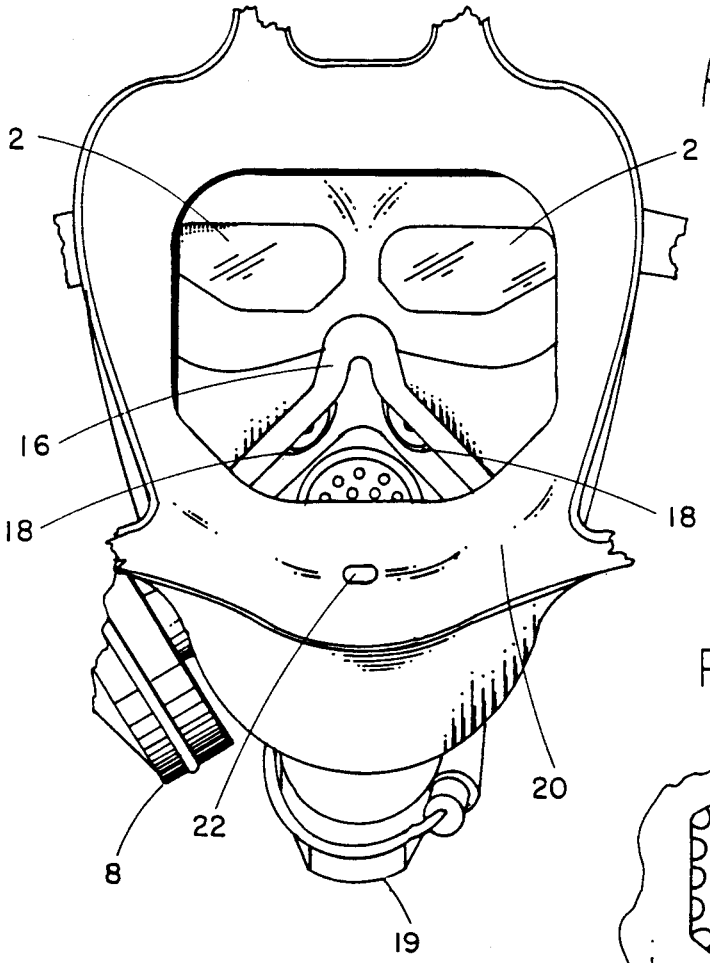
FIG. 2 is an internal view of the mask from the back.
Figure 3:
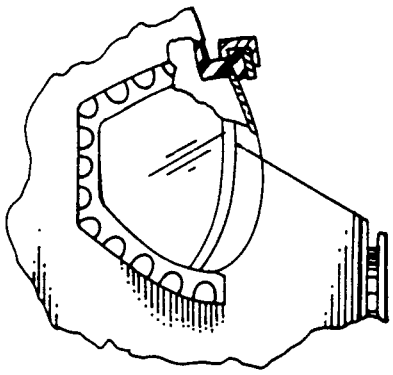
FIG. 3 is a side view of the lens.

Referring now to the drawings and particularly FIG. 1, a pair of lens 2 are illustrated with a crimp ring 4 and individual crimps 6. An inhalation filter 8, a voice transmission device 10 and 12, and an exhalation valve cover 14 are also shown. In FIG. 2, nose cup 16 is shown and when flush against the face, provides a channel from inhalation filter 8 above the nose and to one lens 2 and then over the bridge of the nose to the other lens. Air for breathing is obtained through the nose cup valves 18 and passed into the mouth cavity to be finally removed by the exhalation valve 19. A chin rest 20 is provided with an aperture 22 for perspiration drainage.

The face mask is preferably formed in one piece of a silicone elastomer such as a 60/40 blend of TR-55 and HS-30 manufactured by Dow Corning Company Inc. The elastomer around the lens can be made more resilient by casting a thinner layer in this area which can be defined as that area approximately 15 mm around both eye lens.

Prescription or corrective lens can be provided by applying a detachable corrective lens to the inside surface of the lens. In preferred embodiments, a crimp ring is used to retain a primary outside lens and the mask is contoured on the inside to position a corrective lens.

The lens will preferably have the following:

(a) an inside surface with a spherical radius of 41.165 mm,
(b) an outside surface with a spherical radius of 42.4 mm,
(c) a lens varying in thickness over the entire surface,
(d) a lens thickness at the optical center of about 0.118" (3 mm),
(e) optimum field-of-view, optical compatibility, and stereoacuity such as are obtained by blending a high radius of about 42 mm spherical radius surface with a cylindrical flange of about 55 mm radius used for clamping the lens to the mask, and
(f) lens mounted with the optical centers at about 64 mm apart and about 20 mm from the exit pupil.

While the above description is illustrative of the invention, numerous variations may occur to one of ordinary skill, and thus the invention is intended to be limited only by the appended claims.

What is claimed is:

1. A protective mask comprising: an elastomeric face piece designed to enclose the eyes, nose and mouth of a wearer, a plurality of openings for lens, inhalation filter, exhalation, and voice transmission wherein the lens protrude so as to provide increased peripheral vision.

2. The mask of claim 1 wherein said mask is fitted with detachable prescription lens mounted on the inside of the mask.

3. The mask of claim 1 wherein said mask is fitted with lens having an inside surface with a spherical radius of 41.165 mm.

4. The mask of claim 1 wherein said mask is fitted with lens having an outside surface with a spherical radius of 42.4 mm.

5. The mask of claim 1 wherein said mask is fitted with lens variable in thickness over the entire surface.

6. The mask of claim 1 wherein said mask is fitted with lens having a thickness at the optical center of about 0.118" (3 mm).

7. The mask of claim 1 wherein said mask is fitted with a primary lens mounted by a crimp ring.

8. The mask of claim 1 wherein the lens area is contoured in the inside to position detachable corrective lenses.

9. The mask of claim 1 wherein optimum field-of-view, optical compatibility, and stereoacuity are obtained by combining a high radius of about 42 mm spherical radius surface with a cylindrical flange of about 55 mm radius used for clamping the lens to the mask.

10. The mask of claim 1 wherein lens are mounted with the optical centers at about 64 mm apart and about 20 mm from the exit pupil.

11. The mask of claim 1 wherein the elastomer around the lens is sufficiently resilient so as to permit the lens to move relatively easily in all directions to provide easy optical center adjustment and enhanced compatibility.

12. A protective mask comprising: an elastomeric face piece designed to enclose the eyes, nose and mouth of a wearer, a plurality of openings for lens, inhalation filter, exhalation, voice transmission, and wherein a nose cup is provided which is shaped to provide a channel to pass defogging air to the lens.

13. The mask of claim 12 wherein the nose cup is fitted with one or more exit valves to move air from the lens area, and direct it to the mouth cavity of a wearer for inhalation and exhalation.

14. A protective mask comprising: an elastomeric face piece designed to enclose the eyes, nose and mouth of a wearer, a plurality of openings for lens, inhalation filter, exhalation, voice transmission, and wherein peripheral areas of the mask fold inward to form the seal.

15. The mask of claim 14 wherein the peripheral area of the mask around the chin is formed into a chin rest.

16. A protective mask comprising: an elastomeric face piece designed to enclose the eyes, nose and mouth of a wearer, a plurality of openings for lens, inhalation filter, exhalation, voice transmission, and wherein a nose cup is provided which is shaped to provide a channel to pass defogging air to the lens, and peripheral areas of the mask fold inward to form the seal.

* * * * *